C. B. WOLF & E. B. SMITH.
TALLYING DEVICE.
APPLICATION FILED MAR. 24, 1910.
999,355.
Patented Aug. 1, 1911.
3 SHEETS—SHEET 1.
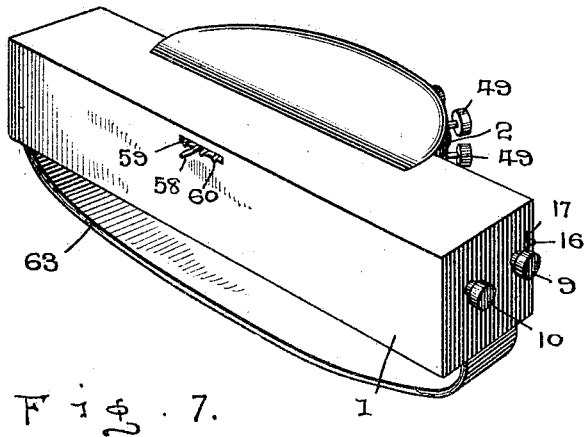
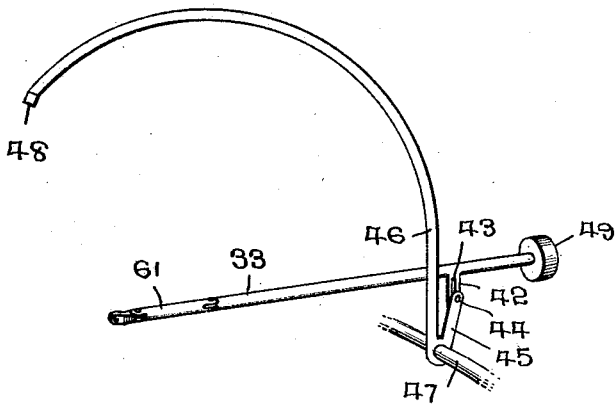
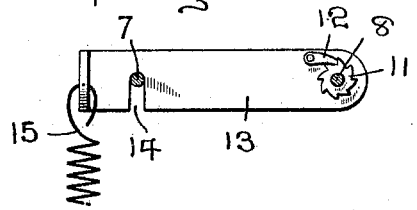
WITNESSES:
INVENTORS
C. B. Wolf
E. B. Smith
BY
W. J. FitzGerald & Co.
Attorneys

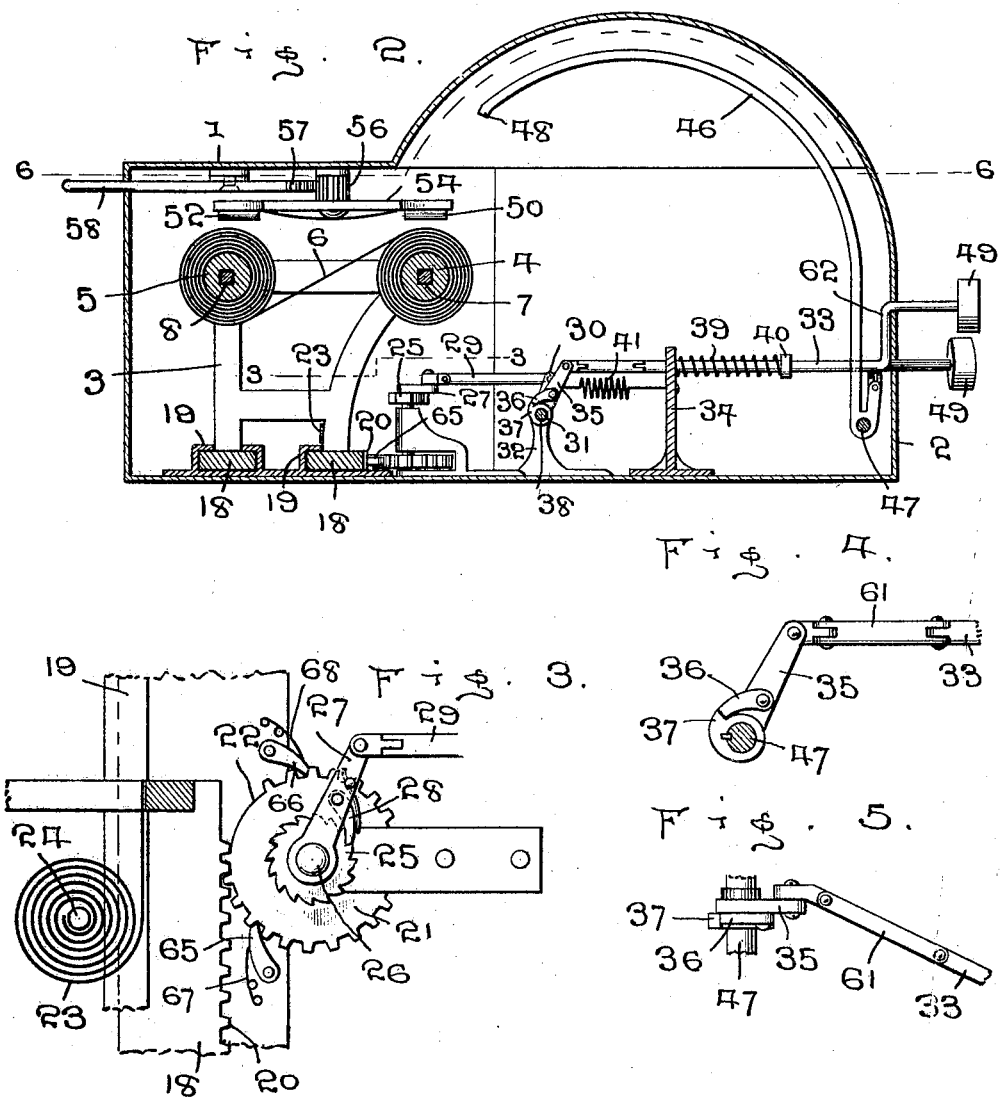

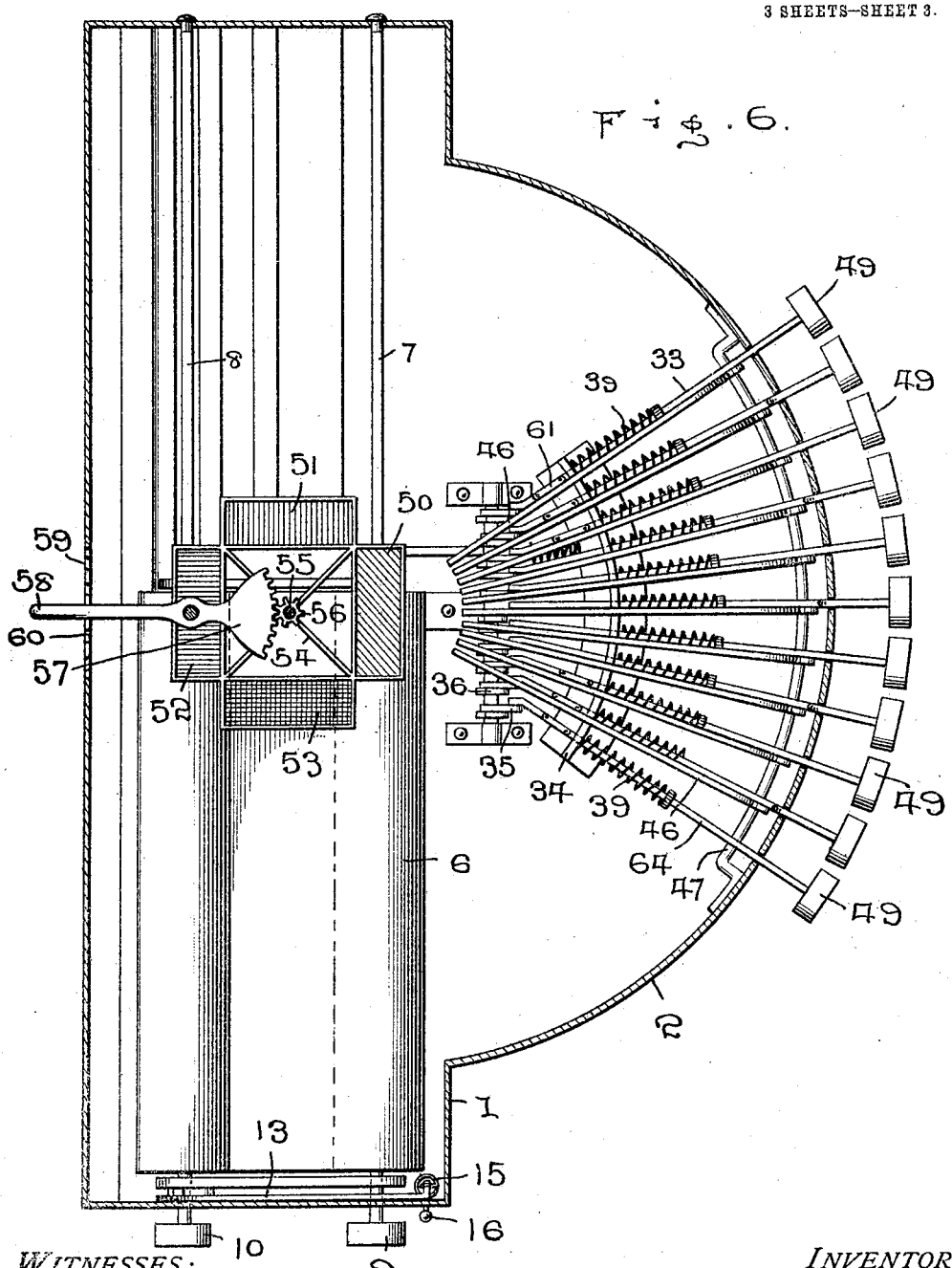

UNITED STATES PATENT OFFICE.

CHARLES B. WOLF, OF FLEMINGTON, AND EGBERT B. SMITH, OF CLARKSBURG, WEST VIRGINIA.

TALLYING DEVICE.

999,355.

Specification of Letters Patent.   Patented Aug. 1, 1911.

Application filed March 24, 1910.   Serial No. 551,279.

*To all whom it may concern:*

Be it known that we, CHARLES B. WOLF and EGBERT B. SMITH, citizens of the United States, residing at Flemington and Clarksburg, respectively, in the counties of Taylor and Harrison and State of West Virginia, have invented certain new and useful Improvements in Tallying Devices; and we do hereby declare the following to be a full, clear, and exact description of the invention, such as will enable others skilled in the art to which it appertains to make and use the same.

Our invention relates to new and useful improvements in tallying devices and our object is to provide means for directing numerals or other tabulating devices into engagement with a section of paper to make an imprint on the paper.

A further object is to provide a ribbon or other ink carrying device, whereby the character moved into engagement with the ribbon will make an imprint of the character upon the paper.

A further object is to provide a plurality of the ribbons varying in color and so mount the same that any one of the ribbons may be turned to position to receive the character forming devices.

A further object is to provide a suitable carriage upon which are rotatably mounted rolls for receiving the paper upon which the imprints are made.

A further object is to provide means for controlling the rotating movement of said rolls.

A further object is to provide suitable keys for operating the imprinting characters.

A further object is to provide means for moving the carriage longitudinally below the point of contact of the imprinting characters.

A further object is to attach the carriage moving mechanism to said operating keys, whereby when each key or the space bar is operated, the carriage will be moved one space longitudinally, and, a still further object is to provide a suitable housing for the recording mechanism, whereby said mechanism may be secured to and operated by one hand.

Other objects and advantages will be hereinafter referred to and more particularly pointed out in the specification and claims.

In the accompanying drawings which are made a part of this application, Figure 1 is a perspective view of the recording device complete. Fig. 2 is a transverse sectional view thereof. Fig. 3 is a detail sectional view as seen on line 3—3 Fig. 2. Fig. 4 is a detail sectional view showing the manner of attaching the keys to the shifting mechanism for the carriage. Fig. 5 is a top plan view thereof. Fig. 6 is a sectional view as seen on line 6—6 Fig. 2. Fig. 7 is a detail perspective view of one of the imprinting devices showing the manner of attaching the same to its operating key, and, Fig. 8 is a detail sectional view of the means employed for controlling the movement of the paper receiving rolls.

Referring to the drawings in which similar reference numerals designate corresponding parts throughout the several views, 1 indicates the casing, which may be constructed in any preferred shape, but is preferably oblong in general outline, one edge wall of the casing having a curved projection 2 thereon for a purpose to be hereinafter set forth. Mounted within the casing 1 is a carriage frame 3, said carriage frame having rolls 4 and 5 thereon, upon which is adapted to be wound a strip of paper or the like 6, the paper being wound from the roller 4 on to the roller 5, said rollers being manually operated to accomplish this result. The shafts 7 and 8 upon which the rollers 4 and 5 are mounted extend the full length of the casing 1 and that portion thereof engaged by the rollers is square in cross section, so that although the rollers are moved lengthwise of the shafts, said rollers will be rotated when the shafts are rotated. The ends of the shafts find bearings in the end walls of the casing and one end of each shaft projects through the casing and is provided with turn buttons 9 and 10 respectively, which are adapted to be rotated to wind the strip of paper upon the rollers and to prevent the reverse rotation of the shaft 8, a ratchet 11 is attached to said shaft, with which coöperates a pawl 12 carried by a brake lever 13.

The brake lever 13 is mounted upon the shaft 8 and has a notch 14 therein, into which enters the shaft 7 and the free end of the lever 13 is caused to frictionally engage the shaft 7 to prevent casual rotation thereof by engaging to the free end of the lever a spring 15, the opposite end of the spring being attached in any suitable manner to the bottom of the casing. The tension of the spring 15 will cause the lever 13 to bind upon the shaft 7 and prevent casual rotation thereof, thereby holding the strip of paper 6 taut between the two rollers, but when it is desired to freely rotate the shaft 7, the lever 13 is elevated by extending a stud 16 through the end wall of the casing 1 and in such position as to be readily engaged to direct upward pressure thereon, said stud extending through a slot 17 in the end wall of the casing and when the free end of the lever is so elevated, the pressure is removed from the shaft 7, thus permitting the same to be freely rotated.

The end sections of the carriage frames are provided with feet 18, which feet slide in sockets 19, thereby holding the carriage in proper alinement as it moves lengthwise of the casing. One of the feet 18 is provided on one of its edges with teeth 20, with which teeth coöperates the teeth of a gear 21 and as said gear is rotated, the carriage will be moved toward one end of the casing. The diameter of the gear is such as to move the carriage from one end of the casing to the opposite end thereof and in order to permit the carriage to return to its initial position when it has been moved lengthwise of the casing, a portion of the teeth on the gear 21 is removed and when the blank space 22 on the gear 21 has been turned adjacent the teeth 20 on the foot 18, the carriage 3 will be returned to its initial position by means of a spring 23, which spring is preferably arranged spirally and has one of its ends attached to the carriage, while the opposite end thereof is secured to a post 24 extending upwardly from the bottom of the casing and it will be readily seen that as the carriage is moved longitudinally by the gear, the tension of said spring will be greatly increased, as it is paid out to follow the carriage.

The gear 21 is rotated through the medium of a ratchet 25, which is mounted upon the shaft 26 carrying the gear 21, a lever 27 being likewise mounted upon said shaft 26 and having a pawl 28 which coöperates with the ratchet and it will be readily seen that as the lever 27 is rocked back and forth, the gear 21 will be intermittently rotated. The lever 27 is operated through the medium of a pitman 29, which pitman is attached to a shank 30 fixed to a shaft 31 and as said shaft is rocked in its bearings 32, the lever 27 will be swung back and forth to operate the gear. The shaft 31 is operated through the medium of a plurality of push rods 33, the outer ends of which project through the curved wall of the projection 2, while the inner ends thereof are entered through a guide plate 34, each push rod being connected to a shank 35, each of which shanks is rotatably mounted upon the shaft 31 and in order to cause the shaft 31 to rotate when the rods 33 are moved inwardly, the shanks 35 have attached thereto a pawl 36, which engages a projection 37 on a disk 38 and as said disk is fixed to the shaft 31, it will be readily seen that as the shanks 35 are moved inwardly by the inward thrust of the push rods, the shaft 31 will be rotated and the pitman 29 moved forwardly to operate the lever 27 and said push rods are returned to their initial position by means of a spring 39, which surrounds the push rod 33 between the guide plate 34 and a collar 40. As the lever 27 is swung inwardly, the pawl 28 will move around the ratchet 25 a sufficient distance to engage the next succeeding tooth on the ratchet and the pitman and lever are returned to their initial positions by means of a spring 41, one end of which spring is attached to the shank 30 and the opposite end thereof to the guide plate 34 and as said lever moves rearwardly, the gear 21 will be rotated to move the carriage longitudinally of the casing the distance of one space.

Each push rod is provided with a depending ear 42 and through each ear is provided a slot 43, with which coöperates a pin 44 carried by the stem 45 of a type bar 46, thereby providing a movable connection between the push rods and type bars. The type bars are rotatably mounted upon a shaft 47, which shaft is curved to conform to the curvature of the projecting wall 2 and the curvature of said wall and shaft is such as to cause all of the type bars to engage the roll 4 at the same relative point, when said type bars are operated one at a time.

As best shown in Fig. 2, the type bars are curved to cause the type end 48 thereof to engage the paper on the roller 4 at a point substantially above the shaft 7, while the pivotal point of the type bar or the shaft 47 is positioned below the push rods 33.

The object in providing the movable connection between the type bar and the push rod is to permit of a swinging movement of the stem of the type bar, while the push rod moves in a straight line.

The outer ends of the push rods 33 are provided with keys 49, which contain a representation of the type upon the end of the type bars and there are preferably eleven of the push rods, one of which is used as a space bar and does not have a type bar attached thereto, while the remaining keys are provided with numerals from one to nine and the zero, the type bars having at their ends corresponding numerals and the zero, so that the operator can readily ascertain what rod to operate in order to get a particular number.

Positioned between the ends of the type bars and the roller 4 is a tape or ribbon having ink thereon, so that when the type is moved into engagement with the ribbon and the ribbon forced against the paper on the roller, an imprint of the character contained upon the type bar will be made upon the paper. There are preferably four ribbons used, as shown at 50, 51, 52 and 53, each ribbon being of a different color, so that the grade of lumber may be indicated as well as the number of feet thereof, as for instance, a blue ribbon will indicate that the lumber is of first grade, a different colored ribbon another grade and so on, while the number of feet will be indicated by the numerals on the paper. The ribbons are secured in any suitable manner to a frame 54, which frame is rotatably mounted on a stub shaft 55 depending from the upper wall of the casing 1 and said frame is rotated to bring any desired ribbon over the roller 4 by attaching thereto a gear 56, with which engages a segmental rack 57, said rack being also pivotally secured to the upper wall of the casing and provided with a handle 58 and it will be readily seen that when the handle is swung back and forth, the frame 54 will be rotated and the proper ribbon positioned to receive the ends of the type bars. The handle 58 is of sufficient length to extend through a slot 59 in the side wall of the casing 1 and by providing one edge of the slot with notches 60, into which the lower portion of the handle 58 seats when moved back and forth, the frame 54 will always be stopped at the proper position to bring the record ribbon in position to receive the ends of the type bars. The ribbons are preferably loosely mounted upon the frame 54 so that as the paper is wound from off the roller 4, the type and ribbon will descend a sufficient distance to permit the type to make an imprint upon the paper and if desired, the ribbons may be adjustably mounted upon the frame, whereby a length of ribbon may be used and gradually moved endwise to renew the ribbon as it becomes worn.

As a portion of the type bars and their respective push rods are disposed at an angle to the longitudinal axis of the rollers in order to cause the ends of all the type bars to strike at approximately the same point, a portion of the push rods are provided with link sections 61, so that although the push rods move in a direct line and at an angle to the arc of the movement of the shank to which said push rods are secured, said shanks will be thrown forwardly to operate the shaft 31, upon which they are mounted, the link section 61 compensating for the variance in movement between the push rod and the shanks to which they are attached.

For convenience of illustration, the push rods and keys attached thereto are all shown as spaced an equal distance apart, but in actual practice in order to provide as compact an instrument as possible, each alternate push rod may be provided with a crank section 62, which will dispose a portion of the keys in a plane above the other keys, in which event, the push rods may be more closely assembled and the amount of space required to accommodate said keys reduced to a minimum.

In operation, the strip of paper is wound upon the roll 4 and the opposite end thereof extended below the roll 5 and attached thereto, when the casing 1 is placed in the hand, the hand being first introduced through a loop 63 depending from the bottom of the casing and this operation will place the fingers of the hand upon that side of the casing through which the ends of the push rods project, while the thumb will remain on the opposite side of the casing in position to engage and operate the handle 58 of the ribbon shifting mechanism. The section of lumber is then measured to ascertain the number of feet therein and if of the first grade, the handle 58 is operated to bring the ribbon 50 in position to receive the ends of the type bars, when the proper type bars are operated and the number of feet of lumber indicated upon the strip of paper, as for instance, if there are twelve feet in the piece being measured, the operator strikes the key containing the numeral "1" and then the key containing the numeral "2," thus indicating upon the paper that there are twelve feet in the piece, while the color of the ribbon will indicate the grade of the lumber. The shifting rod 64 is then operated or moved inwardly, which will move the carriage forward one space, when another piece of lumber is to be measured and indicated as before. The numerals indicating the number of feet in the piece of timber are preferably placed in columns, so that if the piece of timber contains less than ten feet, the number of feet is indicated by operating the proper type bar and the space rod operated twice in succession, which will move the carriage in the proper position to receive the imprint of the key when another piece of timber is measured. If other than the first grade lumber is encountered, the handle 58 is moved laterally and engaged with such notch as will dispose the proper ribbon in position to receive the ends of the type bars, when the keys are operated to imprint upon the paper the number of feet contained within the piece of timber. As soon as the carriage has been moved lengthwise of the casing its full length, the button 10 is rotated and the strip of paper wound upon the roll 5 a sufficient distance to receive a new row of figures and any suitable form of signaling device may be mounted within the casing to indicate when the carriage has moved its full distance in one direction.

The carriage is held in its adjusted position by means of a pair of latches 65 and 66, said latches being pivotally mounted in any suitable manner to the bottom portion of the casing and are preferably positioned on opposite sides of said gear, the latches being held in engagement with the teeth of the gear by means of springs 67 and 68, and by providing the two latches, it will be readily seen that the gear 21 will be held against reverse rotation at all times. It will likewise be seen that when the carriage has been moved its full distance in one direction and the blank space 22 moved into registration with the teeth 20, the carriage will be released from the gear, when the spring 23 will return the carriage to its initial position.

As before stated, the roller 5 is held against reverse rotation by means of the ratchet and pawl carried by the shaft and brake lever respectively, while the roller 4 is held against casual rotation by the pressure of the brake lever on the shaft 7 occasioned by the tension of the spring 15, but when the strip of paper is being wound upon the roller 4 or it is otherwise desired to have said roller freely rotate, upward pressure is directed on the stud 16, which will remove the pressure of the brake lever upon the shaft 7 and permit the roller 4 to readily and freely rotate.

The strip of paper will necessarily be of some length, so that the measurements of a large quantity of lumber may be indicated upon a single strip and by using the different colored ribbons, the grade of the lumber can be ascertained at a glance.

As soon as the strip of paper has been filled with the numerals, it is removed from the roller 5 and filed away for future reference and in view of the compact form of the strip of paper, it will occupy but a minimum amount of space, while at the same time it will be readily accessible for reference thereto.

It will thus be seen that we have provided a positive means for recording the measurements of a piece of lumber and at the same time indicate the grade of the lumber and it will likewise be seen that the device can be constructed compactly, so as to be carried and operated by one hand and it will likewise be seen that in view of the simplicity of the various parts, it can be manufactured at a minimum expense and at the same time be strong and durable.

What we claim is:—

1. In a tallying device, the combination with a casing, a carriage movably mounted in said casing, rods extending the length of said casing and through said carriage frame, rolls carried by the carriage frame and slidably mounted on said rods and adapted to rotate therewith, means whereby said rods may be manually rotated, a strip of paper carried by said rolls and adapted to be wound from one to the other, means to prevent rotation of one of the rolls in one direction, additional means to direct frictional pressure on the other roll to prevent casual rotation thereof, a plurality of type bars, means to move one end of the type bars into engagement with the strip of paper and additional mean coöperating with the type bar operating mechanisms to move the carriage frame and rolls longitudinally of the casing.

2. In a tallying device, the combination with a casing having sockets therein, of a carriage frame having feet adapted to enter and slide in said sockets, rolls carried by said frame and a strip of paper adapted to be wound from one to the other of said rolls, one of said feet having teeth thereon, of a gear having teeth around a portion of its edge adapted to engage the teeth on said foot and move the carriage lengthwise when the gear is rotated, a plurality of type bars, push rods adapted to lower said type bars into engagement with the strip of paper and means interposed between said push rods and said gear adapted to rotate the gear one space with each operation of a push rod.

3. In a tallying device, the combination with a carriage and a gear to move said carriage lengthwise, of a lever means between the lever and gear to rotate the gear when the lever is swung in one direction, a pitman connected at one end to said lever, a shaft having a fixed shank to which the opposite end of said pitman is pivotally attached, a plurality of shanks movable on said shaft, means coöperating with said shaft and movable shanks to cause the shaft to rotate when the shanks are swung in one direction and push rods connected to said movable shanks.

4. In a tallying device, the combination with a movable carriage, of a gear coöperating with said carriage, a shaft carrying said gear, a ratchet fixed to said shaft, a lever pivoted on said shaft, a pawl carried by the lever and coöperating with said ratchet to rotate the shaft and gear when the lever is swung in one direction, a pitman pivoted to the end of said lever, a rotatable shaft, a shank fixed to said rotatable shaft and pivoted to the opposite end of said pitman, a plurality of disks fixed to said rotatable shaft and having projections thereon, a plurality of shanks pivoted on said rotatable shaft, pawls carried by the pivoted shanks adapted to engage said projections and cause the shaft to rotate, push rods engaged with the pivoted shanks and spring means to return the gear actuating parts to their initial positions.

In testimony whereof we have signed our names to this specification in the presence of two subscribing witnesses.

CHARLES B. WOLF.
EGBERT B. SMITH.

Witnesses:
   FLEMING H. HOLDEN,
   W. ROY BYRD.